United States Patent [19]

Layh

[11] Patent Number: 4,788,463
[45] Date of Patent: Nov. 29, 1988

[54] ELECTROMAGNETIC BRAKE

[76] Inventor: Hans-Dieter Layh, Zachersweg 17, D-7121, Gemmrigheim, Fed. Rep. of Germany

[21] Appl. No.: 64,080

[22] Filed: Jun. 19, 1987

[30] Foreign Application Priority Data

Jun. 20, 1985 [DE] Fed. Rep. of Germany ....... 3620797

[51] Int. Cl.⁴ ............................................. H02K 7/102
[52] U.S. Cl. ........................................ 310/77; 310/93; 188/72.3; 188/161
[58] Field of Search ...................... 310/76, 77, 78, 79, 310/92, 93, 100, 60 A; 192/35, 75, 84 T; 188/70 B, 70 R, 156, 161, 171, 72.1, 72.2, 72.3

[56] References Cited

U.S. PATENT DOCUMENTS 4,069,901 1/1978 Sessler .............................. 192/84 T

FOREIGN PATENT DOCUMENTS 0052430 3/1986 Japan .................................. 188/163

Primary Examiner—Mark O. Budd
Assistant Examiner—Judson H. Jones
Attorney, Agent, or Firm—Barnes & Thornburg

[57] ABSTRACT

An electromagnetic brake having brake shoes which are mounted immobile in circumferential direction with respect to a shaft, but are movable in radial direction. The brake shoes interact with a concentric ring-shaped brake stator having a toroid coil and a magnetizable ring housing that force the brake shoes in a radial direction opposite that of a radial force produced by a spring connected to the brake shoes, centrifical force, or a permanent magnet.

15 Claims, 1 Drawing Sheet

ELECTROMAGNETIC BRAKE

BACKGROUND AND SUMMARY OF THE INVENTION

The invention relates to an electromagnetic brake having brake segments that are elastically disposed at a shaft or a part connected with said shaft, and that interact with an electromagnetic brake stator or brake magnet which forces the brake segments against a stationary braking area or lifts them off said braking area.

In the case of known electromagnetic brakes of this type, a brake disk, as the brake segment, is mounted at the shaft or at a hub part arranged on the shaft by spring elements to move in an axial direction but fixed so as to essentially not be rotated relative to the shaft. The spring elements, that are leaf springs, can be manufactured only with large tolerances. Thus, a relatively extensive adjusting device is necessary in order to ensure a sufficiently reproduceable position of the brake disk when the brake is not actuated. If necessary, the manufacturing tolerances can be reduced if the brake disk are guided axially on the shaft or the hub part by interacting grooves and recesses. However, arrangements of this type tend to generate noise. Under certain circumstances, tolerances that are too low and when the brake is not actuated may cause the brake disks to grind at the brake magnet or at the stationary braking area.

In known electromagnetic drum brakes, the brake shoes are pressed from the inside against the brake drum by an electromagnet that is arranged transversely to the drum brake. For this purpose, the brake shoes, that are curved in axial view of the brake drum at one end, are disposed to be pivotable around an axis parallel to the axis of the drum. The electromagnet is applied to the other end of the brake shoes. Arrangements of this type also require careful adjusting that must be checked from time to time in order to compensate for the wear of the brake shoes. The adjusting is necessary because the adjusting forces generated by the electromagnet also depend on the adjusting path that becomes continuously longer because of the wear of the brake shoes.

It is therefore the objective of the invention to provide an electromagnetic brake that is constructively simple, and provides reproduceable braking forces with minimal adjustments.

This objective is achieved by a brake stator or brake magnet having two ring-shaped pole pieces that are arranged concentrically to the axis of the shaft and can be oppositely magnetized, and brake segments being arranged radially adjacent or concentric to the pole pieces with radial mobility at the shaft or at a hub part or the like and connected with said shaft are acted upon by springs that force the brake segments from the pole pieces and towards stops on the shaft or on the hub part.

Since the brake segments, when the brake is not actuated, take up a fixed, constructively indicated position, any precise adjusting in this case is not required. In addition, the braking force is extensively independent of the wear of the brake segments. The reason is that in the position when the brake is in effect, the brake segments are magnetically attracted by the ring-shaped pole parts and will close the gap between the pole parts irrespective of the wear. The magnetic forces between the brake segments and the pole parts are most extensively independent of the material thickness of the brake segments.

In a preferred embodiment of the invention, the brake stator or brake magnet has an annular coil that is arranged concentrically with respect to the shaft axis in a magnetically soft or hard ring housing having an annulus that is radially open on the side facing the brake segments. This results in an extremely compact and constructively simple brake stator or brake magnet. The ring housing, with respect to an axial plane, has a horseshoe-shaped or preferably rectangularly U-shaped cross-section that, if necessary, also permits a segmented construction.

This is an advantage particularly when the ring housing is a permanent magnet that tries to pull the brake segment continuously into the position in which the brake is in effect, and the coil is able to generate a magnetic field that is opposite to the field of the permanent magnet in order to release the brake. In this case, a ring-shaped permanent magnet may easily be arranged as part of a softly magnetic ring housing.

If necessary, a friction surface may be arranged between the edges of the front sides of the ring housing or the pole parts on the side of the brake segments that interacts with the brake segments and consists of a non-magnetizable material. However, it is also possible for the pole parts or the front sides of the ring housing to interact directly with the brake segments.

If the brake stator or the brake magnet is to be operated by alternating current, rectifier elements that are connected to the coil may be housed inside the ring housing or in recesses of said ring housing so that again an extremely compact construction is made possible.

Other objects, advantages and novel features of the present invention will become apparent from the following detailed description of the invention when considered in conjunction with the accompanying drawings.

DETAILED DESCRIPTION OF THE DRAWINGS

Figure 1:
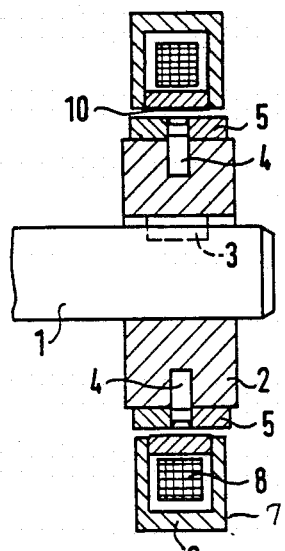
FIG. 1 is a cross-sectional view of a first embodiment of the present invention.

In the case of the embodiment according to FIG. 1, a hub 2 is mounted on a shaft 1 in a torsionally fixed way to rotate therewith. The mounting, for example, includes a driver wedge 3 that is slid into axial grooves of the shaft 1 and of the hub 2 that are opposite one another.

Figure 2:
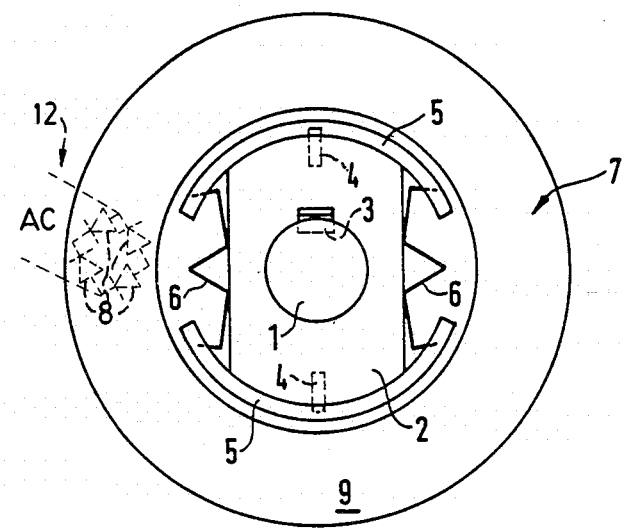
FIG. 2 is an axial view of the embodiment of FIG. 1.

The hub 2, according to FIG. 2, has two circular sides that are opposite one another and that are located in a joint circumferential surface of a regular cylinder. Between these curved surfaces of the circular sides, plane surfaces are arranged that are opposite one another symmetrically with respect to the axis of the hub 2. Thus, in axial view, the hub 2 represents a dihedron.

In the center of the curved surfaces, journals 4 project radially out of the hub 2 and are received in corresponding recesses of brake shoes or brake segments 5. The brake shoes or brake segments 5, in axial view of the hub 2, have a circular-arc shape such that they may be able to rest planely on the curved circumferential-surface portions of the hub 2.

The ends of the brake shoes or brake segments 5, according to FIG. 2, project over the curved circumferential-surface area of the hub 2. Profiled leaf springs 6 connect the opposed ends of the brake shoes or brake segments 5. The leaf springs 6 tension the brake shoes or brake segments 5 against the curved circumferential surface areas of the hub 2.

A brake stator or brake magnet 7 is arranged concentrically to the axis of the shaft 1, and encloses the hub 2 with the brake shoes or brake segments 5.

The brake stator or brake magnet 7 consists essentially of an annular coil 8 that encloses the hub 2, and a ring housing 9. The housing 9, that in the present case consists of a softly magnetic material, in the sectional view of FIG. 1, has a rectangularly U-shaped cross-section forming an annulus that is open in the direction of the hub 2. The annular coil 8 is housed in said annulus.

A ring-shaped friction surface 10, which consists of a non-magnetizable material, is fixedly arranged between the front parts of the ring housing 9 that may have a segmented construction.

When direct current is applied to the annular coil 8, the ring housing 9 is magnetized. The edges of the front sides of the ring housing 9, on the side of the hub 2, form the ring-shaped north and south poles of the brake stator or brake magnet 7. If the current that is applied to the annular coil 8 is sufficiently high, the force produced by the ring-shaped poles of the brake stator or brake magnet 7 is sufficient to overcome the force of the leaf springs 6 and force the brake shoes or brake segments 5 radially outward against the friction surface 10 or the edges of the ring housing 9 that face the brake shoes or brake segments 5. As a result, relative movements between the brake stator or the brake magnet 7 and the shaft 1 as well as the hub 2 can be braked effectively. In addition, an effective locking of the hub 2 or the shaft 1 is possible.

In addition to the special constructive simplicity and compact construction, it is advantageous that the brake shoes or brake segments 5 take up a defined and reproduceable position which requires no adjusiing when the electromagnetic brake is not in effect. In addition, braking forces are achieved that can be reproduced extremely well because the possibly occurring wear of material at the brake shoes or brake segments has practically no influence on the magnetic forces which act between said brake shoes or segments 5 and the brake stator or brake magnet 7 when the brake is in effect.

Finally, it is advantageous that the magnetic field generated by the annular coil 8 is shielded practically completely from the outside by the ring housing 9 as well as the brake shoes or brake segments 5.

Figure 3:
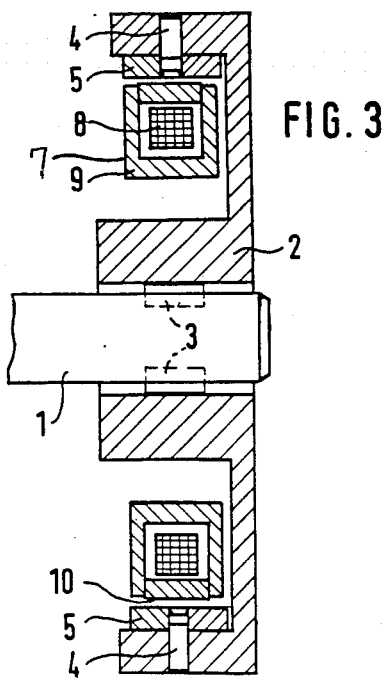
FIG. 3 is a cross-sectional view of a second embodiment of the present invention.

The embodiment according to FIG. 3 differs from that according to FIGS. 1 and 2 in that the brake shoes or brake segments 5 are arranged on the inner circumferential surface of a drum-shaped hub 2. Journals 4 provide a bearing of the brake shoes or brake segments 5 that is immobile in circumferential direction of the hub 2. In addition, the brake stator or brake magnet 7 is arranged inside the drum-shaped hub 2 and the annulus of the ring housing 9 that is open radially toward the outside, on its exterior side and is closed off by the friction area 10.

When electricity is applied to the annular coil 8, the brake segments or brake shoes 5 are pulled radially inward by magnetic forces so that the brake becomes effective.

Figure 4:
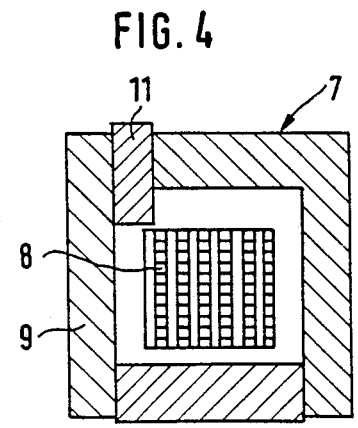
FIG. 4 is a cross-sectional view of a ring housing having a permanent ring magnet as a part of the ring housing.

FIG. 4 shows a brake stator or magnet 7, wherein the segmented ring housing 9 consists of connected softly magnetic parts and a ring-shaped permanent magnet 11 which magnetizes the ring housing 9. With brake stator or brake magnet of FIG. 4 in the embodiments of FIGS. 1-3, the brake shoes or segments 5 would therefore be pulled by permanent magnet 11 continuously into the position in which the brake is in effect when the annular coil 8 is without current. When electric current in the appropriate current direction is applied to the annular coil 8, a magnetic field is generated that compensates the magnetic field of the permanent magnet 11, so that the brake shoes or segments 5 by means of spring and/or centrifugal force, are adjusted into their position in which the brake is not in effect.

In the embodiments according to FIGS. 1 to 3, the brake effect occurs when the annular coil 8 is activated by current, whereas, in the case of a modification of the embodiments shown in FIGS. 1 to 3, corresponding to FIG. 4, the braking effect occurs when the annular coil 8 is without current.

As a rule, the annular coil 8 is activated directly by direct current. However, if necessary, a connecting of the brake stator or the brake magnet 7 to alternating forcing a full wave rectifier, which is illustrated in phantom by a diode in FIG. 2, as 12, are connected to the coil 8 and may be housed inside the ring housing 9 or in recesses of said ring housing 9.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An electromagnetic brake comprising:
 a shaft;
 brake segments;
 a stationary braking area mounted concentric to said brake segments and said shaft;
 means mounting said brake segments concentric to said shaft for forcing said brake segments in a first radial direction away from said braking area; and
 an electromagnetic brake stator mounted concentrical to said brake segments for generating magnetic forces which directly forces said brake segments in a second radial direction toward said braking area opposite said first radial direction.

2. An electromagnetic brake according to claim 1, wherein the brake stator includes a magnetizable ring housing with an annulus that is radially open on a side facing the brake segments, and an annular coil mounted concentric to the shaft in said annulus.

3. An electromagnetic brake according to claim 2, wherein the ring housing has a U-shaped cross-section in an axial direction.

4. An electromagnetic brake according to claim 2, wherein said braking area is mounted between the edges of the front sides of the ring housing facing the brake segment.

5. An electromagnetic brake according to claim 1, wherein the brake segments are mounted on the outer circumference of a hub fixedly mounted to said shaft.

6. An electromagnetic brake according to claim 1, wherein said means mounting said brake segments to said shaft includes radial pins which permit a radial movement and restricts circumferential movement between said brake segments and shaft.

7. An electromagnetic brake according to claim 1, wherein said means mounting said brake segments of said shaft includes leaf springs connected between adjacent ends of the brake segments for biasing the brake segments radially in said first radial direction.

8. An electromagnetic brake comprising:
a shaft;
brake segments;
a stationary braking area mounted concentric to said brake segments;
means mounting said brake segments to said shaft for forcing said brake segments in a first radial direction with respect to said braking area;
an electromagnetic brake stator mounted concentrical to said brake segments for forcing said brake segments in a second radial direction with respect to said braking area opposite said first radial direction;
said brake stator including a magnetizable magnetically soft ring housing with an annulus that is radially open on a side facing the brake segments, a ring-shaped permanent magnet in said ring housing for oppositely magnetizing the front sides of the ring housing to force said brake segments in said first radial direction, and an annular coil mounted concentric to said shaft in said annulus for generating a magnetic field that is opposed to the permanent magnet when activated to force said brake segments in said second radial direction.

9. an electromagnetic brake comprising:
a shaft;
brake segments;
a stationary braking area mounted concentric to said brake segments;
means mounting said brake segments on an inner circumference of a drum-type hub fixed mounted on said shaft for forcing said brake segments in a first radial direction with respect to said braking area; and
an electromagnetic brake stator mounted concentrical to said brake segments for forcing said brake segments in a second radial direction with respect to said braking area opposite said first radial direction.

10. An electromagnetic brake according to claim 9, wherein said braking area is mounted on said brake stator, said means mounting said brake segments to said shaft forces said brake segments towards said braking area and said electromagnetic means forces said brake segments away from said braking area.

11. An electromagnetic brake according to claim 10, wherein said means mounting said brake segments to said shaft includes radial pins which permit a radial movement and restricts circumferential movement between said brake segments and shaft, and a permanent magnet in magnetizable housing of said electromagnet for forcing said brake segment towards said braking area.

12. An electromagnetic brake according to claim 9, wherein said braking area is mounted on said brake stator, said means mounting said brake segments to said shaft forces said brake segments away from said braking area and said electromagnetic means forces said brake segments towards said braking area.

13. An electromagnetic brake comprising:
a shaft;
brake segments;
a stationary braking area mounted concentric to said brake segments;
means mounting said brake segments to said shaft for forcing said brake segments in a first radial direction with respect to said braking area;
an electromagnetic brake stator mounted concentrical to said brake segments for forcing said brake segments in a second radial direction with respect to said braking area opposite said first radial direction;
said brake stator including a pair of spaced ring shaped pole pieces mounted concentrical to said brake segments and a coil for oppositely magnetizing said pole pieces when energized.

14. An electromagnetic brake according to claim 13, including rectifier arrangements connected to the coil and mounted in the brake stator.

15. An electromagnetic brake according to claim 13, wherein said braking area is mounted between the edges of the front sides of the pole pieces facing the brake segment.

* * * * *

UNITED STATES PATENT AND TRADEMARK OFFICE
CERTIFICATE OF CORRECTION

PATENT NO. : 4,788,463

DATED : November 29, 1988

INVENTOR(S) : Hans-Dieter Layh

It is certified that error appears in the above-identified patent and that said Letters Patent is hereby corrected as shown below:

On the Title Page, Item [30],
Foreign Application Priority Data:

June 20, 1986 [DE] Fed. Republic of Germany ..... 3620797.

Signed and Sealed this

Sixteenth Day of May, 1989

Attest:

DONALD J. QUIGG

Attesting Officer

Commissioner of Patents and Trademarks